(12) United States Patent
Shimizukawa et al.

(10) Patent No.: US 10,754,047 B2
(45) Date of Patent: Aug. 25, 2020

(54) RADIOGRAPHIC IMAGE DETECTION DEVICE

(71) Applicant: FUJIFILM Corporation, Tokyo (JP)

(72) Inventors: Sho Shimizukawa, Ashigarakami-gun (JP); Masateru Tateishi, Ashigarakami-gun (JP); Koji Taninai, Ashigarakami-gun (JP); Kohei Gemma, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/292,674

(22) Filed: Mar. 5, 2019

(65) Prior Publication Data

US 2019/0277981 A1 Sep. 12, 2019

(30) Foreign Application Priority Data

Mar. 6, 2018 (JP) .................................. 2018-039374

(51) Int. Cl.
*G01T 1/20* (2006.01)
*G01T 1/208* (2006.01)

(52) U.S. Cl.
CPC ............ *G01T 1/208* (2013.01); *G01T 1/2018* (2013.01)

(58) Field of Classification Search
CPC ... A61B 1/4208; G01T 1/2018; G01T 1/2023; G01T 1/208
See application file for complete search history.

(56) References Cited

U.S. PATENT DOCUMENTS

| | | | |
|---|---|---|---|
| 2008/0083877 A1* | 4/2008 | Nomura | G01T 1/2018 250/370.11 |
| 2014/0021365 A1* | 1/2014 | Oda | G01T 1/17 250/395 |
| 2018/0031715 A1 | 2/2018 | Kuwabara | |
| 2018/0333121 A1* | 11/2018 | Kuwabara | A61B 6/4266 |

FOREIGN PATENT DOCUMENTS

JP 2018-15455 A 2/2018

* cited by examiner

*Primary Examiner* — Mark R Gaworecki
(74) *Attorney, Agent, or Firm* — Birch, Stewart, Kolasch & Birch, LLP.

(57) ABSTRACT

An electronic cassette has a configuration in which a first sensor panel and a second sensor panel are sequentially arranged in a thickness direction. The first sensor panel includes a first light detection substrate and a first scintillator. The periphery of the first scintillator is covered by a moisture-proof sealing layer. The sealing layer is made of a conductive material. The sealing layer is connected to the inner surface of a housing made of a conductive material through a connection portion. Therefore, the sealing layer has the same potential as the ground potential of the housing which is a reference potential and functions as a conductor layer.

7 Claims, 8 Drawing Sheets

RADIOGRAPHIC IMAGE DETECTION DEVICE

CROSS-REFERENCE TO RELATED APPLICATIONS

This application claims priority under 35 U.S.C § 119(a) to Japanese Patent Application No. 2018-039374 filed on 6 Mar. 2018. The above application is hereby expressly incorporated by reference, in its entirety, into the present application.

BACKGROUND OF THE INVENTION

1. Field of the Invention

The present invention relates to a radiographic image detection device.

2. Description of the Related Art

In a medical field, a diagnosis is made on the basis of a radiographic image detected by a radiographic image detection device. The radiographic image detection device comprises a sensor panel. The sensor panel has an imaging region in which a plurality of pixels are two-dimensionally arranged. As is well known, the pixel accumulates charge in response to radiation which has been emitted from a radiation source and then transmitted through a subject (patient). The radiographic image detection device comprising the sensor panel is also called a flat panel detector (FPD).

As disclosed in JP2018-015455A (corresponding to US2018/031715A1), a radiographic image detection device has a configuration in which two sensor panels are sequentially arranged in a thickness direction. The radiographic image detection device disclosed in JP2018-015455A is used for a so-called energy subtraction (hereinafter, abbreviated to ES) method and charge is accumulated in the pixels of two sensor panels at the same time by one radiation emission operation. Then, a bone tissue image and/or a soft tissue image except bone tissues is generated or an index value related to bones, such as a bone mass or bone density, is calculated, on the basis of two radiographic images detected by two sensor panels.

In JP2018-015455A, a metal layer that is made of, for example, copper or tin and absorbs a large number of soft ray components in energy forming radiation is provided between the two sensor panels. That is, the metal layer functions as a radiation filter for restricting the incidence of soft ray components on the lower sensor panel of the two sensor panels.

SUMMARY OF THE INVENTION

In a radiographic image detection device having the configuration disclosed in JP2018-015455A in which two sensor panels are sequentially arranged in the thickness direction, the mutual interference of two sensor panels is a problem. The problem is, for example, that electromagnetic noise generated in one sensor panel is propagated to the other sensor panel and the quality of a radiographic image is degraded by the influence of the electromagnetic noise. This problem is an important problem to be solved especially since the reliability of the index value is significantly reduced in a system for calculating the index value related to bones as in JP2018-015455A. JP2018-015455A discloses a technique that filters soft ray components with a metal layer, but does not disclose any method for solving the problem of the mutual interference of two sensor panels.

An object of the invention is to provide a radiographic image detection device that can suppress the mutual interference of two sensor panels sequentially arranged in a thickness direction.

In order to solve the above-mentioned problems, according to the invention, there is provided a radiographic image detection device comprising: two sensor panels that are sequentially arranged in a thickness direction and have imaging regions in which pixels that accumulate charge in response to radiation, which has been emitted from a radiation source and transmitted through a subject, are two-dimensionally arranged; and a conductor layer that is provided between the two sensor panels and has a reference potential.

Preferably, the conductor layer is provided so as to cover at least the imaging regions in a plan view.

Preferably, at least one of the two sensor panels includes a scintillator that converts the radiation which has been incident into visible light and emits the visible light, a light detection substrate in which the imaging region is formed and which detects the visible light emitted from the scintillator and converts the visible light into the charge, and a conductive member of which at least a portion is provided at a position that faces the light detection substrate with the scintillator interposed therebetween, and the conductive member functions as the conductor layer.

Preferably, the reference potential is a ground potential or a power supply potential which is a constant potential that is supplied from a power supply unit to the conductor layer and is maintained.

Preferably, the radiographic image detection device further comprises a switch that switches between an on state in which power is supplied to the conductor layer and an off state in which the supply of power to the conductor layer is stopped in a case in which the reference potential is the power supply potential.

Preferably, the conductor layer is made of any one of aluminum, copper, tin, tungsten, lead, or carbon.

Preferably, two circuit units that convert the charge into a digital signal and output the digital signal as a radiographic image are provided for the two sensor panels, respectively, and two radiographic images output from the two circuit units are used to calculate an index value related to bones.

According to the invention, the conductor layer having the reference potential is provided between two sensor panels that are sequentially arranged in the thickness direction. Therefore, it is possible to provide a radiographic image detection device that can suppress the mutual interference of two sensor panels sequentially arranged in the thickness direction.

DESCRIPTION OF THE PREFERRED EMBODIMENTS

First Embodiment

Figure 1:
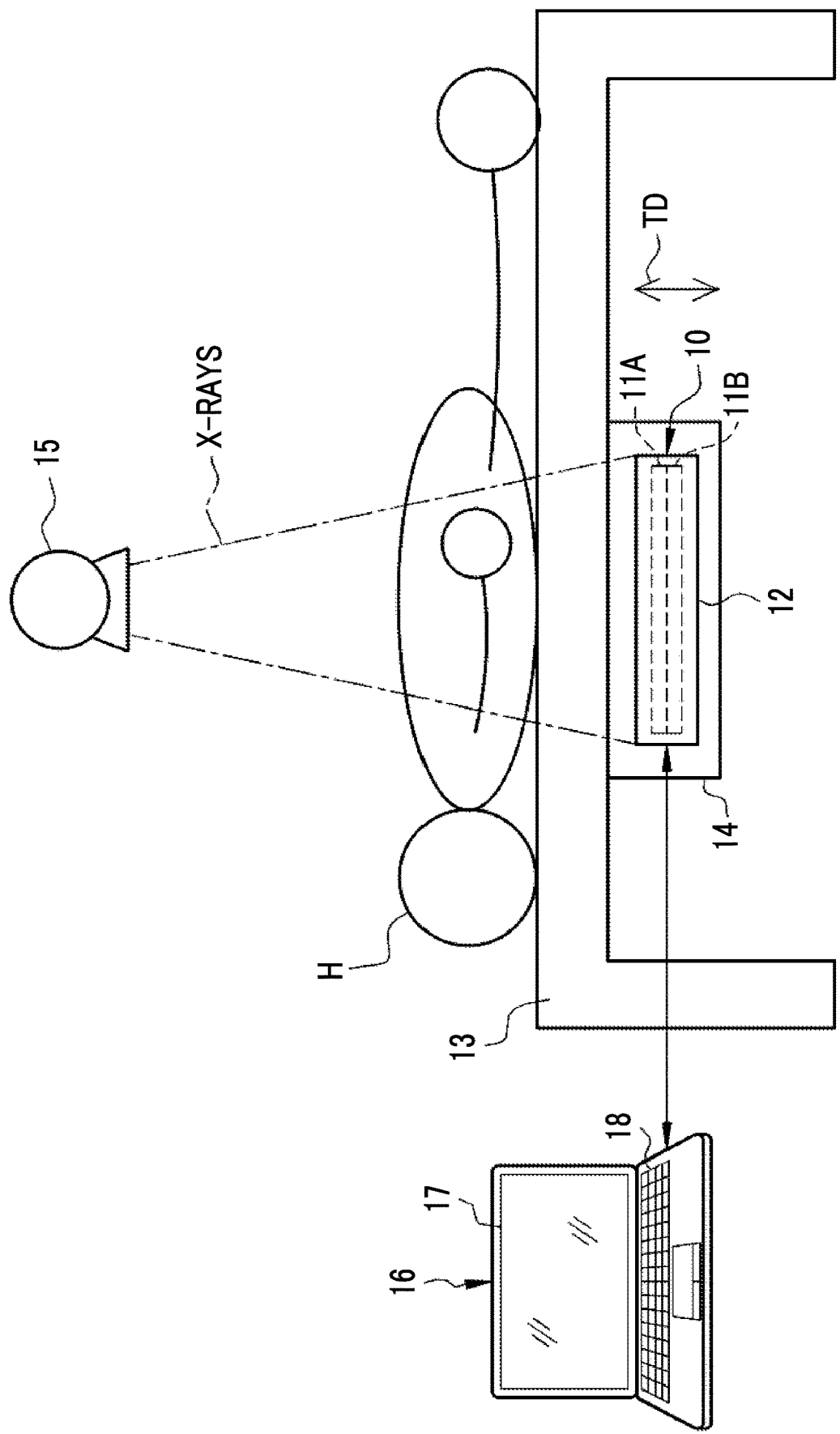
FIG. 1 is a diagram illustrating an aspect of X-ray imaging.

In FIG. 1, an electronic cassette 10 corresponding to a radiographic image detection device according to the invention has a first sensor panel 11A and a second sensor panel 11B which are accommodated in a housing 12. The first and second sensor panels 11A and 11B are thin plates having a rectangular shape in a plan view and are sequentially arranged in a thickness direction TD.

The housing 12 is a portable box having a rectangular parallelepiped shape and has a size which is based on the International Organization for Standardization (ISO) 4090: 2001 and is substantially equal to the size of, for example, a film cassette, an imaging plate (IP) cassette, or a computed radiography (CR) cassette. The housing 12 is made of a conductive material, such as a resin mixed with carbon fibers, a resin mixed with an aluminum or nickel filler, an aluminum alloy, or a magnesium alloy.

The electronic cassette 10 is set in a holder 14 of an imaging table 13 on which a subject H lies supine. Then, the electronic cassette 10 receives X-rays (represented by a one-dot chain line) corresponding to radiation which has been emitted from an X-ray source 15 corresponding to a radiation source and then transmitted through the subject H and detects an X-ray image corresponding to a radiographic image.

The electronic cassette 10 is connected to a console 16 and communicates with the console 16 to transmit and receive various kinds of information. Various kinds of information include, for example, the X-ray images detected by the electronic cassette 10 and an imaging menu input by an operator through the console 16. The imaging menu is, for example, a set of an imaging part, such as the head or the chest, a posture, such as an upright position, a lying position, or a sitting position, and the orientation of the subject H with respect to X-rays, such as the front, the side, or the back.

For example, the console 16 is configured by installing a control program, such as an operating system, and various application programs in a computer such as a notebook personal computer. The console 16 includes a display 17 and an input device 18 such as a touch pad or a keyboard. For example, the X-ray image transmitted from the electronic cassette 10 is displayed on the display 17.

Figure 2:
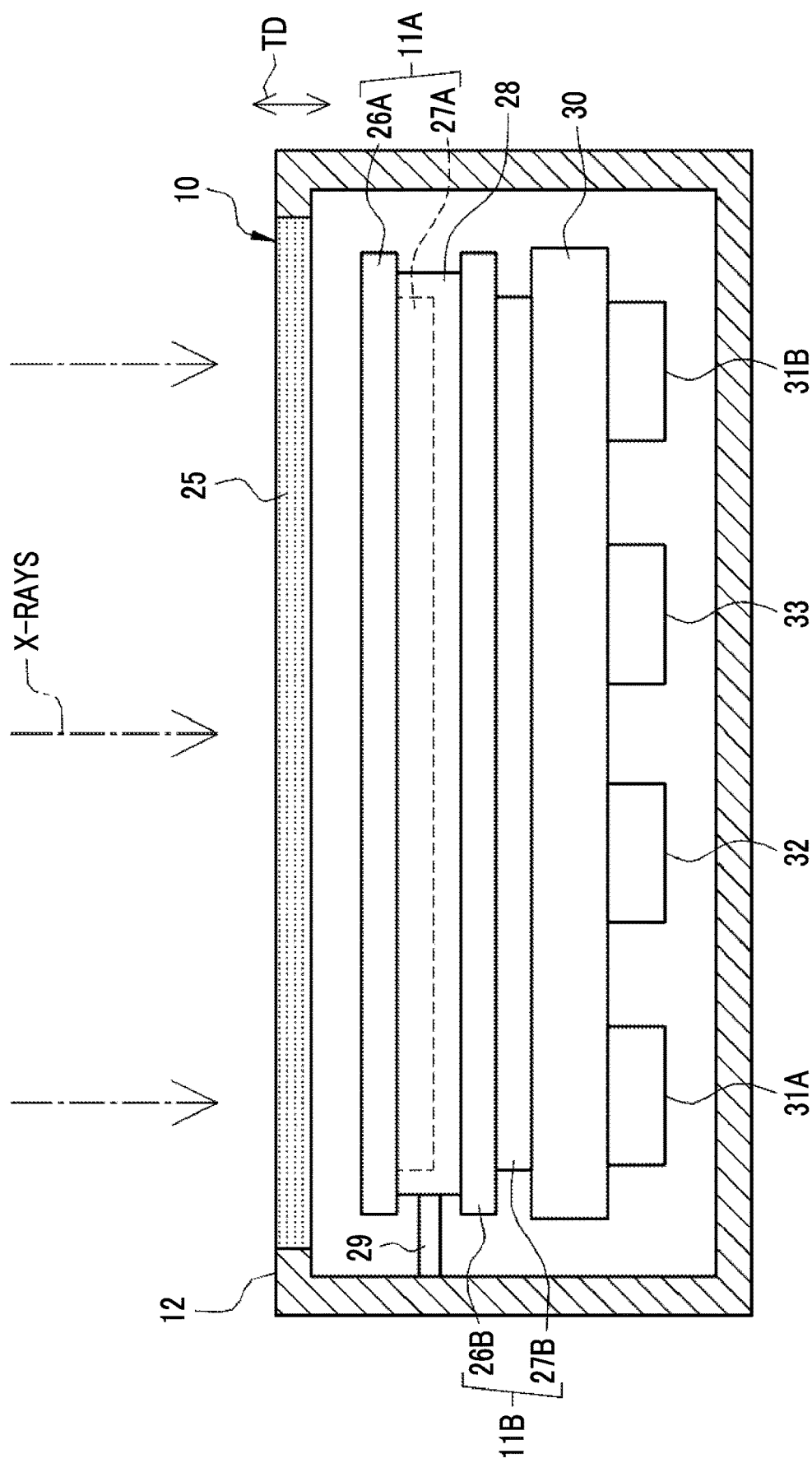
FIG. 2 is a diagram illustrating the internal structure of an electronic cassette.

In FIG. 2, a rectangular opening is formed in a front surface of the housing 12 on which X-rays are incident and a transmission plate 25 that transmits X-rays is attached to the opening. The first sensor panel 11A and the second sensor panel 11B are provided immediately below the transmission plate 25. Here, the thickness direction TD in which the first and second sensor panels 11A and 11B are sequentially arranged is a direction that is parallel to a line normal to the front surface of the housing 12 and a rear surface of the housing 12 opposite to the front surface. The first sensor panel 11A includes a first light detection substrate 26A and a first scintillator 27A. The first light detection substrate 26A and the first scintillator 27A are arranged in the order of the first light detection substrate 26A and the first scintillator 27A as viewed from the front surface of the housing 12 on which X-rays are incident. Similarly, the second sensor panel 11B includes a second light detection substrate 26B and a second scintillator 27B which are arranged in the order of the second light detection substrate 26B and the second scintillator 27B as viewed from the front surface of the housing 12.

The first scintillator 27A has a phosphor, such as CsI:Tl (thallium-activated cesium iodide), and the second scintillator 27B has a phosphor, such as GOS ($Gd_2O_2S$:Tb, terbium-activated gadolinium oxysulfide). Each of the first and second scintillators 27A and 27B converts incident X-rays into visible light and emits the visible light. The first and second light detection substrates 26A and 26B detect the visible light emitted from the first and second scintillators 27A and 27B and convert the visible light into charge.

The periphery of the first scintillator 27A is covered with a moisture-proof sealing layer 28. The sealing layer 28 is, for example, an aluminum thin film with a thickness of 10 μm and is made of a conductive material. The sealing layer 28 corresponds to a conductive member of which at least a portion is located at a position that faces the light detection substrate with the scintillator interposed therebetween. The sealing layer 28 is connected to the inner surface of the housing 12 made of a conductive material through a connection portion 29. Therefore, the sealing layer 28 has the same potential as the ground potential of the housing 12 which is a reference potential and functions as a conductor layer. In addition, the connection portion 29 includes metal parts, such as a conductive wire, a bridging plate, and screws.

The housing 12 accommodates a base 30, a first circuit unit 31A, a second circuit unit 31B, a power supply unit 32, and a control unit 33 in addition to the first and second sensor panels 11A and 11B. The first circuit unit 31A is for the first sensor panel 11A. In addition, the second circuit unit 31B is for the second sensor panel 11B. The first and second sensor panels 11A and 11B are attached to a front surface (on which X-rays are incident) of the base 30 and the first and second circuit units 31A and 31B, the power supply unit 32, and the control unit 33 are attached to a rear surface (opposite to the front surface) of the base 30. The base 30 is fixed to the inner surface of the housing 12 by, for example, a resin adhesive. Further, the housing 12 accommodates a cable connector (not illustrated) that performs wired communication with the console 16 and receives power from a commercial power supply in addition to these components. The housing 12 may accommodate an antenna for wireless communication with the console 16 and a battery for wirelessly driving the electronic cassette 10.

Figure 3:
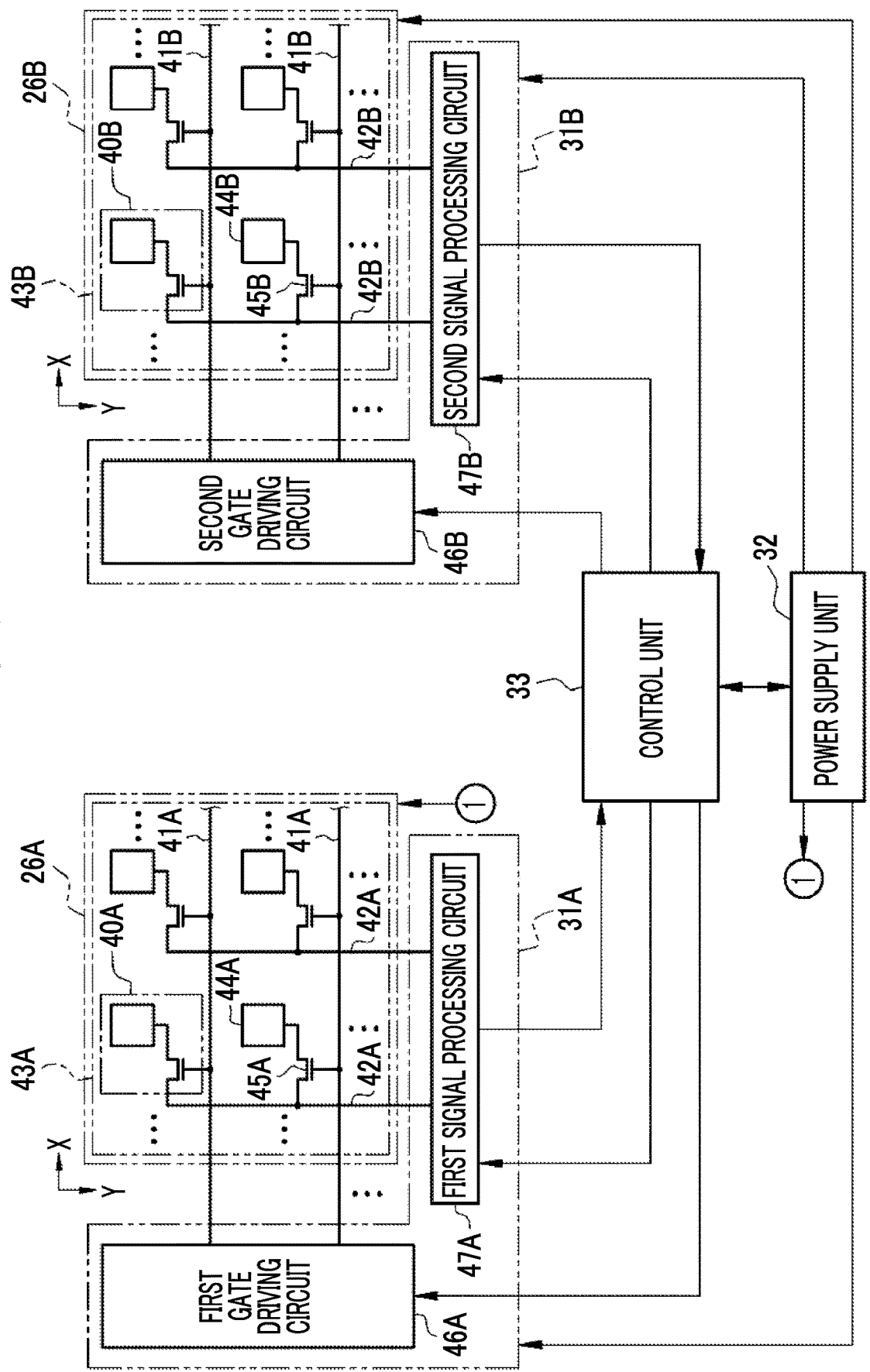
FIG. 3 is a block diagram illustrating the electrical configuration of the electronic cassette.

In FIG. 3, the first light detection substrate 26A is configured by providing first pixels 40A which are arranged in a two-dimensional matrix of N rows and M columns, N first gate lines 41A, and M first signal lines 42A on a glass substrate (not illustrated). The first gate lines 41A extend in the X direction along a row direction of the first pixels 40A and are arranged at a predetermined pitch in the Y direction along a column direction of the first pixels 40A. The first signal lines 42A extend in the Y direction and are arranged at a predetermined pitch in the X direction. The first gate lines 41A and the first signal lines 42A are orthogonal to each other and the first pixels 40A are provided so as to correspond to the intersection points between the first gate lines 41A and the first signal lines 42A. A region in which the first pixels 40A are two-dimensionally arranged is a first imaging region 43A (also see FIG. 4). The size of the first imaging region 43A in a plan view is substantially equal to the size of the first scintillator 27A or is slightly less than the size of the first scintillator 27A.

N and M are integers that are equal to or greater than 2. For example, N is 2880 and M is 2304. In addition, the array of the first pixels 40A may be a square array as illustrated in FIG. 3. The first pixels 40A may be inclined at 45° and may be arranged in zigzag.

As is well known, the first pixel 40A comprises a first photoelectric conversion unit 44A on which visible light is incident and which generates charge (electron-hole pair) and accumulates the charge and a first thin film transistor (TFT) 45A. The first photoelectric conversion unit 44A has a structure in which an upper electrode and a lower electrode are provided on the upper and lower sides of a semiconductor layer that generates charge. The semiconductor layer is, for example, a p-intrinsic-n (PIN) type and includes an N-type layer provided on the upper electrode side and a P-type layer provided on the lower electrode side. The first TFT 45A has a gate electrode connected to the first gate line 41A, a source electrode connected to the first signal line 42A, and a drain electrode connected to the lower electrode of the first photoelectric conversion unit 44A. In addition, a light detection substrate that is not a TFT type, but is a complementary metal oxide semiconductor (CMOS) type may be used.

A bias line (not illustrated) is connected to the upper electrode of the first photoelectric conversion unit 44A. A positive bias voltage is applied to the upper electrode through the bias line. The positive bias voltage is applied to generate an electric field in the semiconductor layer. Therefore, in the electron-hole pair generated in the semiconductor layer by photoelectric conversion, the electron is moved to the upper electrode and is absorbed by the bias line and the hole is moved to the lower electrode and is collected as charge.

The second light detection substrate 26B has the same configuration as the first light detection substrate 26A. Therefore, alphabet "B" is added next to numbers for components of the second light detection substrate 26B to distinguish the components from the components of the first light detection substrate 26A and the description of the components will not be repeated.

The first circuit unit 31A includes a first gate driving circuit 46A and a first signal processing circuit 47A. The first gate driving circuit 46A is connected to the ends of the first gate lines 41A and generates a gate pulse for driving the first TFTs 45A. The control unit 33 drives the first TFTs 45A through the first gate driving circuit 46A and controls the driving of the first signal processing circuit 47A to control the operation of the first sensor panel 11A. Specifically, the control unit 33 directs the first sensor panel 11A to perform a pixel reset operation which reads dark charge from the first pixel 40A and resets (removes) the dark charge, a pixel charge accumulation operation which accumulates charge corresponding to the amount of X-rays reaching the first pixel 40A in the first pixel 40A, and an image reading operation which reads the charge accumulated in the first pixel 40A to the first signal processing circuit 47A through the first signal line 42A.

The first signal processing circuit 47A converts the accumulated charge read from the first pixel 40A by the image reading operation into an analog voltage signal. Then, the first signal processing circuit 47A performs a known correlated double sampling process for the analog voltage signal to remove a noise component from the analog voltage signal. Then, the first signal processing circuit 47A converts the analog voltage signal into a digital signal corresponding to the voltage value of the analog voltage signal (analog/digital conversion) and outputs the digital signal to the control unit 33. The control unit 33 stores the digital signal output from the first signal processing circuit 47A as an X-ray image (a first X-ray image, see FIG. 6) in an embedded memory (not illustrated). In addition, the second circuit unit 31B has the same configuration as the first circuit unit 31A. Therefore, similarly to the second light detection substrate 26B, alphabet "B" is added next to numbers for components of the second circuit unit 31B to distinguish the components from the components of the first circuit unit 31A and the description of the components will not be repeated.

The power supply unit 32 supplies power to the first and second sensor panels 11A and 11B and the first and second circuit units 31A and 31B under the control of the control unit 33. The power supply unit 32 is provided with a switching power supply. The switching power supply converts a voltage based on power from a battery or a commercial power supply into a voltage suitable for the first and second sensor panels 11A and 11B and the first and second circuit units 31A and 31B using a pulse modulation method, for example, a pulse width modulation (PWM) method and outputs the voltage.

Figure 4:
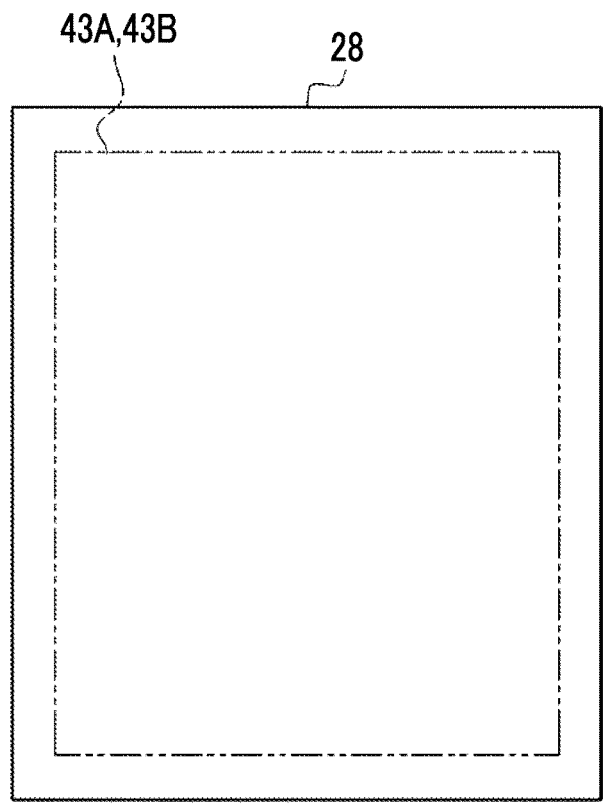
FIG. 4 is a diagram illustrating the arrangement relationship and the magnitude relationship between a sealing layer and each imaging region in a plan view.

FIG. 4 is a diagram illustrating the arrangement relationship and the magnitude relationship between the sealing layer 28 functioning as a conductor layer and the first and second imaging regions 43A and 43B which are formed in the first and second light detection substrates 26A and 26B, respectively, in a plan view. The first and second imaging regions 43A and 43B have the same size and are formed at the same position in a plan view as represented by a one-dot chain line. The sealing layer 28 is provided so as to cover at least the first and second imaging regions 43A and 43B in a plan view.

Figure 5:
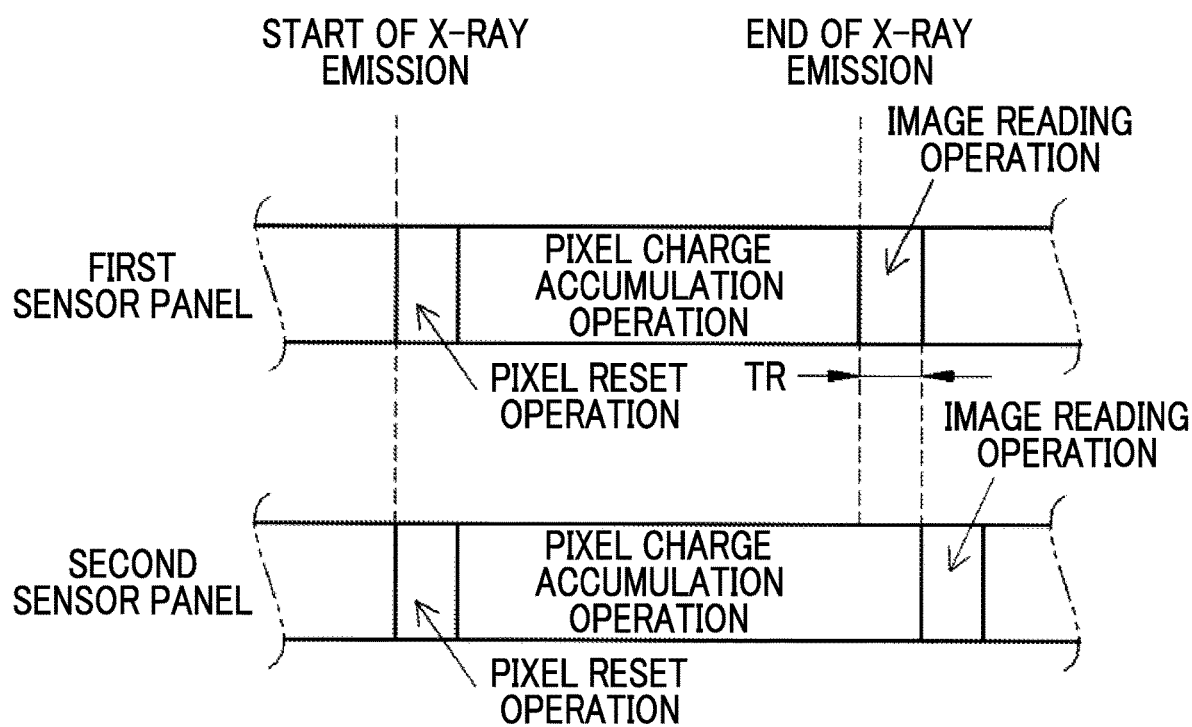
FIG. 5 is a diagram illustrating the timing of each operation of each sensor panel.

In FIG. 5, the control unit 33 directs each of the first and second sensor panels 11A and 11B to perform the pixel charge accumulation operation according to the emission start timing of X-rays after the pixel reset operation. Then, first, the control unit 33 directs the first sensor panel 11A to perform the image reading operation according to the emission end timing of X-rays. The control unit 33 directs the second sensor panel 11B to perform the image reading operation after the image reading operation of the first sensor panel 11A ends.

That is, the pixel charge accumulation operations of the first and second sensor panels 11A and 11B start at the same time, but the image reading operations thereof do not start at the same time. Specifically, the start timing of the image reading operation of the second sensor panel 11B is later than the start timing of the image reading operation of the first sensor panel 11A by a period TR. Contrary to FIG. 5, the control unit 33 may direct the second sensor panel 11B to perform the image reading operation first.

Figure 6:
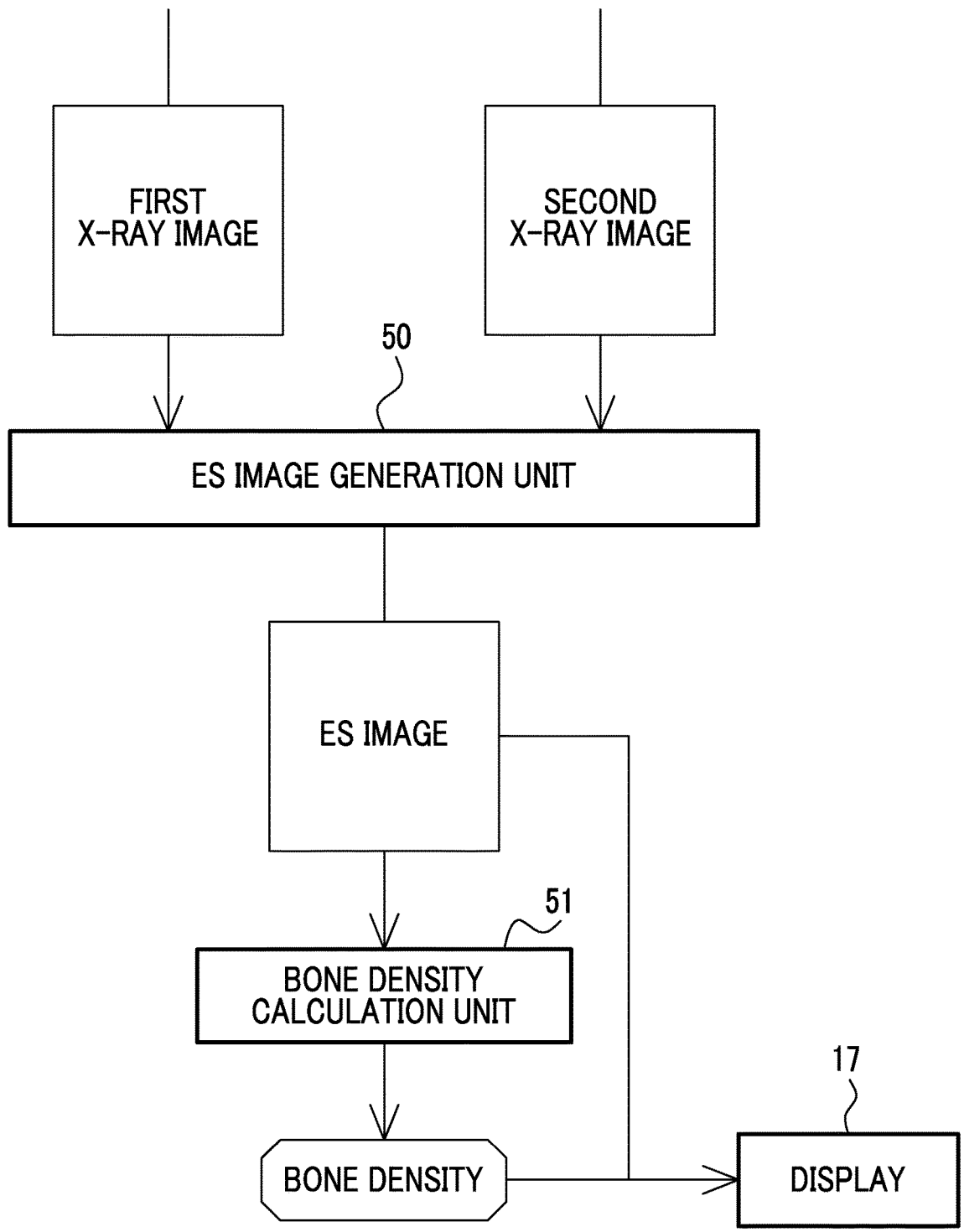
FIG. 6 is a block diagram illustrating the configuration of a console related to the calculation of bone density.

In FIG. 6, the console 16 receives the first X-ray image from the first sensor panel 11A and receives the second X-ray image from the second sensor panel 11B. The first X-ray image and the second X-ray image are based on the charge accumulated in each of the first and second pixels 40A and 40B in response to the X-rays which have been emitted from the X-ray source 15 and then transmitted through the subject H and indicate the internal structure of the body of the subject H.

An offset correction process which removes artifacts caused by fixed pattern noise which is an example of noise caused by the usage environment of the electronic cassette 10, such as environmental temperature, is performed for the first X-ray image and the second X-ray image and then the first X-ray image and the second X-ray image are input to an ES image generation unit 50. The ES image generation unit 50 generates an ES image from the first X-ray image and the second X-ray image. Specifically, the ES image generation unit 50 subtracts an image obtained by multiplying the first X-ray image by a predetermined coefficient from an image obtained by multiplying the second X-ray image by a predetermined coefficient in units of pixels. The ES image generated by the subtraction process is, for example, an image in which soft tissues have been removed and bone tissues have been highlighted.

A bone density calculation unit 51 calculates bone density in an imaging part of the subject H as an index value related to bones. Specifically, first, the bone density calculation unit 51 analyzes the ES image from the ES image generation unit 50 to extract a bone tissue region of the ES image. Then, for example, the bone density calculation unit 51 multiplies a representative value (for example, the mean, maximum value, or mode) of the pixel values of the bone tissue region by a conversion coefficient for converting the pixel values into a bone mass to calculate the bone mass. The bone density calculation unit 51 divides the calculated bone mass by the area of the bone tissue region to calculate bone density.

The console 16 displays, for example, the bone density calculated by the bone density calculation unit 51 and the ES image generated by the ES image generation unit 50 on the display 17. As such, the X-ray images output from the first and second sensor panels 11A and 11B are used to calculate the index value related to bones. Further, in addition to or instead of the bone density, the bone mass may be displayed on the display 17.

For example, an application program related to X-ray imaging is executed to construct the ES image generation unit 50 and the bone density calculation unit 51 in a central processing unit (CPU) of the console 16. Some or all of the above-mentioned units may be constructed in the CPU of the electronic cassette 10 and the electronic cassette 10 may perform the generation of the ES image or bone density calculation.

Next, the operation of the above-mentioned configuration will be described. In a case in which X-ray imaging is performed for the subject H using the electronic cassette 10, the operator turns on the electronic cassette 10 and sets the electronic cassette 10 in the holder 14 of the imaging table 13. Then, the operator adjusts the positional relationship among the electronic cassette 10, the X-ray source 15, and the subject H and then operates the X-ray source 15 to emit X-rays.

The X-rays which have been emitted from the X-ray source 15 and then transmitted through the subject H are incident on the first sensor panel 11A and the second sensor panel 11B through the transmission plate 25. The first and second sensor panels 11A and 11B receive the emitted X-rays and sequentially perform the pixel reset operation and the pixel charge accumulation operation as illustrated in FIG. 5. The charge corresponding to the amount of X-rays reaching each of the first and second pixels 40A and 40B is accumulated in each of the first and second pixels 40A and 40B.

After the emission of X-rays ends, first, the image reading operation is performed in the first sensor panel 11A. Then, the image reading operation is performed in the second sensor panel 11B. Then, the first X-ray image is output from the first sensor panel 11A and the second X-ray image is output from the second sensor panel 11B.

Here, it has been known that electromagnetic noise occurs at the time of the image reading operation. The electromagnetic noise is mainly TFT driving noise that occurs in a case in which the gate electrode is turned on and off in response to a gate pulse from the gate driving circuit.

As illustrated in FIG. 5, there is a time lag of the period TR between the image reading operation of the first sensor panel 11A and the image reading operation of the second sensor panel 11B. Therefore, in a case in which there are no measures for the time lag as in JP2018-015455A, there is a concern that the electromagnetic noise occurring in the first sensor panel 11A which is performing the image reading operation will be propagated to the second sensor panel 11B which is performing the pixel charge accumulation operation for the period TR. In a case in which the electromagnetic noise is propagated to the second sensor panel 11B, charge caused by the electromagnetic noise is accumulated in the second pixel 40B. As a result, the quality of the second X-ray image is degraded.

However, in the invention, as illustrated in FIG. 2, the sealing layer 28 provided between the first and second sensor panels 11A and 11B is electrically connected to the housing 12 through the connection portion 29 and has the ground potential which is the reference potential. In addition, as illustrated in FIG. 4, the sealing layer 28 is provided so as to cover at least the first and second imaging regions 43A and 43B in a plan view. Therefore, the sealing layer 28 functions as an electromagnetic shield to effectively prevent the propagation of electromagnetic noise to the second sensor panel 11B. As a result, it is possible to suppress the mutual interference between the first and second sensor panels 11A and 11B sequentially arranged in the thickness direction TD.

The sealing layer 28 is formed to protect the first scintillator 27A from moisture. The sealing layer 28 is not newly prepared as a conductor layer for the electromagnetic shield of each of the first and second sensor panels 11A and 11B, but is the existing component. As such, since the existing component functions as the conductor layer, it is possible to reduce component costs and to contribute to a reduction in the thickness of the electronic cassette 10.

Each X-ray image is transmitted from the electronic cassette 10 to the console 16. In the console 16, as illustrated in FIG. 6, the ES image generation unit 50 generates an ES image and the bone density calculation unit 51 calculates bone density on the basis of the ES image. The bone density is displayed on the display 17 together with, for example, the ES image.

In a case in which the quality of the X-ray image which is the origin of the calculation of the index value related to bones, such as bone density, is not guaranteed, there is a concern that the reliability of the index value will be significantly reduced. However, in the invention, since the quality of the X-ray image is guaranteed, it is possible to improve the reliability of the index value.

In the configuration in which the first and second sensor panels 11A and 11B are sequentially arranged in the thickness direction, the amount of radiation reaching the second sensor panel 11B is reduced to 10% to 20% of the amount of radiation reaching the first sensor panel 11A. Therefore, the signal-noise (SN) ratio of the second X-ray image is reduced. In a case in which electromagnetic noise is propagated, the influence of the electromagnetic noise is relatively large. Therefore, the invention is effective in the configuration in which the first and second sensor panels 11A and 11B are sequentially arranged in the thickness direction.

Figure 7:
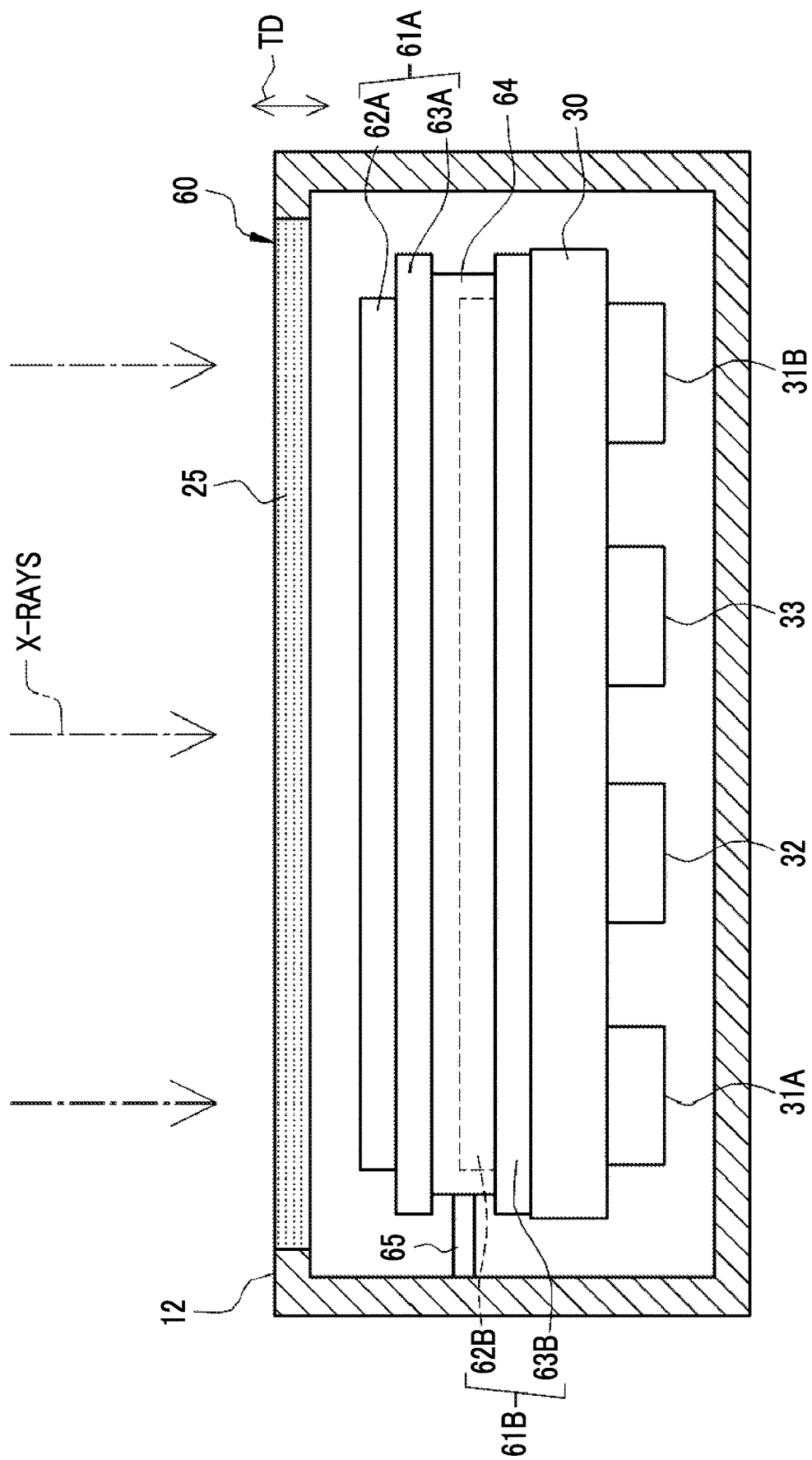
FIG. 7 is a diagram illustrating the internal structure of an electronic cassette according to another example.

In an electronic cassette 60 illustrated in FIG. 7, the arrangement order of scintillators and light detection substrates is reverse to that in the electronic cassette 10. That is, in a first sensor panel 61A provided immediately below the transmission plate 25, a first scintillator 62A and a first light detection substrate 63A are arranged in this order as viewed from the front surface of the housing 12 on which X-rays are incident. Similarly, in a second sensor panel 61B, a second scintillator 62B and a second light detection substrate 63B are arranged in this order as viewed from the front surface of the housing 12 on which X-rays are incident. In addition, the same members as those in the electronic cassette 10 are denoted by the same reference numerals and the description thereof will not be repeated.

In the electronic cassette 60, the first scintillator 62A has a phosphor, such as GOS ($Gd_2O_2S$:Tb, terbium-activated gadolinium oxysulfide), and the second scintillator 62B has a phosphor, such as CsI:Tl (thallium-activated cesium iodide). The periphery of the second scintillator 62B is covered by a moisture-proof sealing layer 64. The sealing layer 64 is connected to the housing 12 through a connection portion 65 and has a ground potential. As such, the invention can also be applied to the electronic cassette 60 in which the arrangement order of the scintillators and the light detection substrates is reverse.

Figure 8:
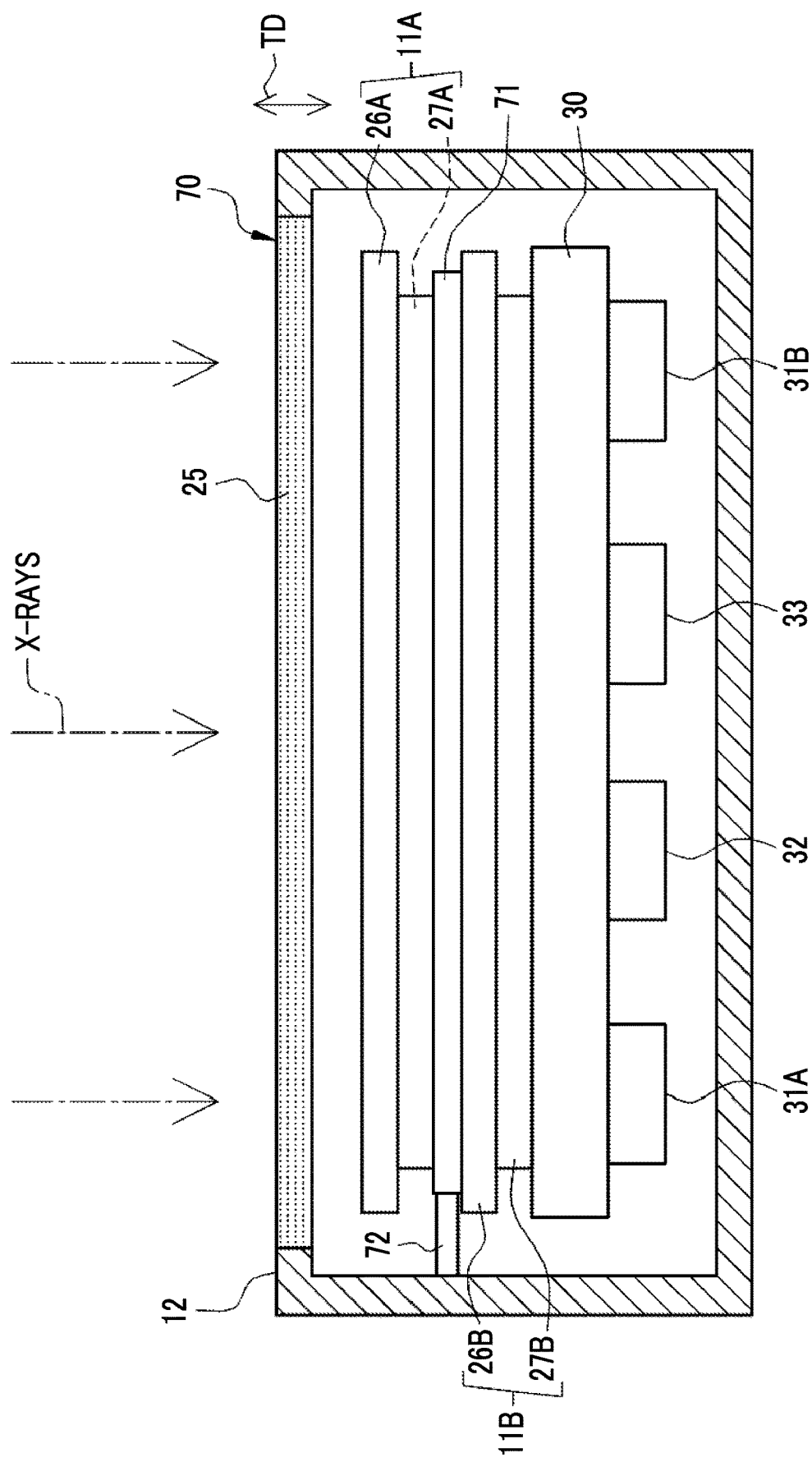
FIG. 8 is a diagram illustrating the internal structure of an electronic cassette according to still another example.

An electronic cassette 70 illustrated in FIG. 8 has the same basic configuration as the electronic cassette 10 and differs from the electronic cassette 10 in that the first scintillator 27A is not covered by the sealing layer 28 and a dedicated conductor layer 71 is provided between the first and second sensor panels 11A and 11B instead of the sealing layer 28. The conductor layer 71 is connected to the housing 12 through a connection portion 72, similarly to the sealing layer 28, and has a ground potential. In addition, the same members as those in the electronic cassette 10 are denoted by the same reference numerals and the description thereof will not be repeated.

For example, the conductor layer 71 is obtained by forming an aluminum film on a film sheet made of a resin, such as polyethylene terephthalate (PET), using vapor deposition and has a thickness of, for example, 0.1 mm. Specifically, the conductor layer 71 is, for example, the product name "VM-PET" manufactured by Toray Film Co., Ltd. or "ALPET (registered trademark)" manufactured by Panac Co., Ltd.

In the configuration illustrated in FIG. 8 in which the sealing layer 28 is not provided, but the dedicated conductor layer 71 is provided, the mutual interference between the first and second sensor panels 11A and 11B can be suppressed by the conductor layer 71.

The invention also includes a case in which a dedicated conductor layer, such as the conductor layer 71 of the electronic cassette 70, is provided separately from the sealing layers 28 and 64 in the configurations having the sealing layers 28 and 64, such as the electronic cassettes 10 and 60, which is not illustrated in the drawings.

The material forming the conductor layer is not limited to aluminum. The conductor layer may be made of any one of copper, tin, tungsten, lead, or carbon. In a case in which the conductor layer is made of a material having a relatively high X-ray shielding performance, such as tungsten or lead, the conductor layer can also function as a radiation filter for restricting the incidence of soft ray components on the lower sensor panel of the two sensor panels. In the case of copper, tin, tungsten, lead, and carbon, the thickness of the conductor layer is, for example, 1 mm.

In addition, the conductor layer is not limited to a thin film shape. The conductor layer may have a mesh shape as long as it can sufficiently function as the electromagnetic shield.

The invention can also be applied to an electronic cassette using a direct-conversion-type sensor panel that directly converts X-rays into charge using a photoconductive film made of, for example, amorphous selenium, which is not illustrated in the drawings. Since the direct-conversion-type sensor panel does not include the sealing layer, a dedicated conductor layer is provided as in the electronic cassette 70 in FIG. 8.

In the first embodiment, the sealing layer is given as an example of the conductive member that functions as the conductor layer. However, the invention is not limited thereto. There are the following sensor panels: a sensor panel formed by growing a scintillator layer on a light detection substrate and covering the scintillator with a sealing layer, like the sensor panel 11 according to the first embodiment; and a sensor panel formed by growing a scintillator layer on a substrate which is a thin flat plate made of, for example, aluminum and attaching a structure which is a set of the substrate and the scintillator to a light detection substrate. In the case of the latter sensor panel, the substrate made of, for example, aluminum is a conductive member. The substrate may function as the conductor layer.

Second Embodiment

Figure 9:
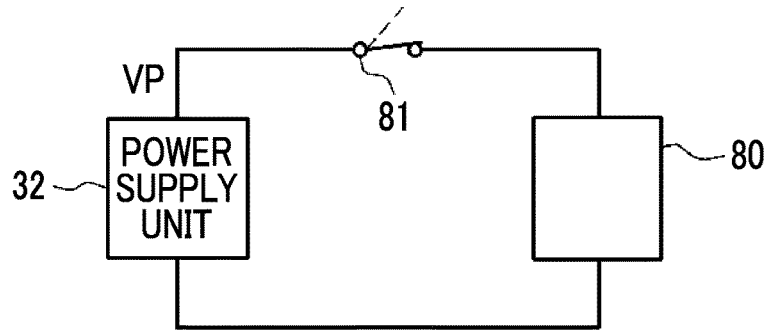
FIG. 9 is a circuit diagram illustrating a third embodiment in which a reference potential is a power supply potential.
Figure 10:
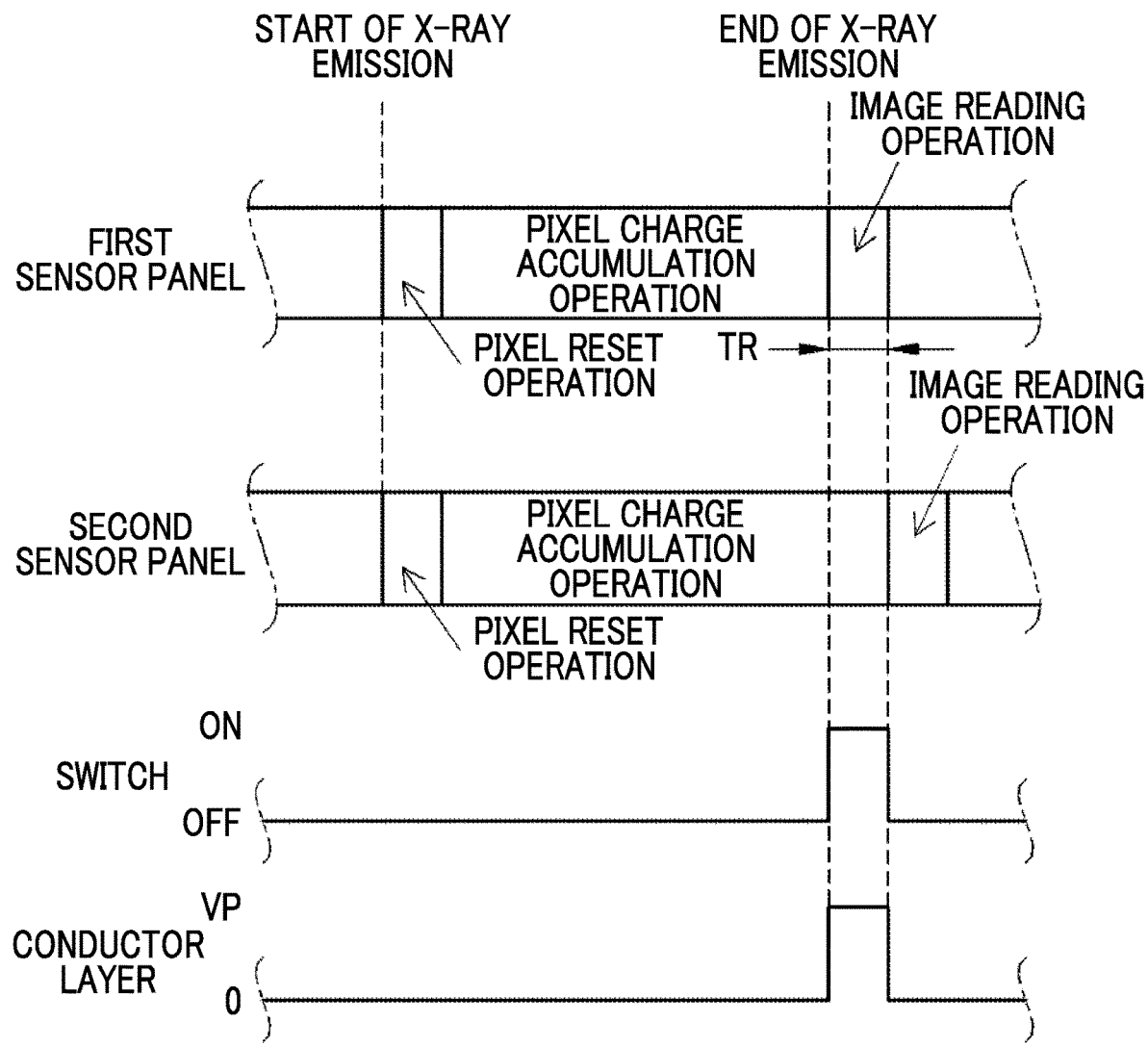
FIG. 10 is a diagram illustrating the timing of each operation of each sensor panel, the on/off timing of a switch, and the potential switching timing of a conductor layer.

In a second embodiment illustrated in FIGS. 9 and 10, the reference potential is a power supply potential which is constant, is supplied from the power supply unit 32, and is maintained, instead of the ground potential described in the first embodiment.

In FIG. 9, the power supply unit 32 is connected to a conductor layer 80 according to this embodiment. The power supply unit 32 applies a power supply voltage VP to the conductor layer 80. Then, the potential of the conductor layer 80 becomes the power supply potential. The power supply voltage VP is, for example, the bias voltage applied to each of the first and second photoelectric conversion units 44A and 44B or a driving voltage which is the origin of the gate pulse and is applied to each of the first and second gate driving circuits 46A and 46B.

The conductor layer 80 is provided separately from the sealing layer 28 similarly to the conductor layer 71 illustrated in FIG. 8. Therefore, the conductor layer 80 is electrically connected only to the power supply unit 32 and is not electrically connected to, for example, the housing 12. In the following description, the basic configuration other than the above is the same as that of the electronic cassette 10.

A switch 81 is connected between the power supply unit 32 and the conductor layer 80. The switch 81 switches between an on state (power supply state) which is represented by a solid line and in which power is supplied from the power supply unit 32 to the conductor layer 80 and an off state (power supply stop state) which is represented by a dashed line and in which the supply of power to the conductor layer 80 is stopped.

As illustrated in FIG. 10, the switch 81 is turned on only for the period TR for which the image reading operation of the first sensor panel 11A and the pixel charge accumulation operation of the second sensor panel 11B overlap each other. Therefore, the conductor layer 80 has the power supply potential only for the period TR.

As such, the conductor layer 80 may be electrically connected to the power supply unit 32, instead of being electrically connected to the housing 12, and the reference potential may be the power supply potential which is supplied from the power supply unit 32 and is maintained. In addition, in a case in which the reference potential is the power supply potential, in the configuration in which the switch 81 is provided and switches between the on state and the off state, the switch is in the off state for a period other than the period TR for which electromagnetic noise is likely to be propagated as illustrated in FIG. 10, which makes it possible to suppress an increase in power consumption.

In the above description, the conductor layer 80 is electrically connected to the power supply unit 32. However, the conductor layer 80 may have the power supply potential or the conductor layer 80 may be electrically connected to the first and second circuit units 31A and 31B. Specifically, the conductor layer 80 may be electrically connected to, for example, the input terminals for the power supply voltage VP in the first and second circuit units 31A and 31B.

The state in which "two sensor panels are sequentially arranged in the thickness direction" is not limited to the state in which two sensor panels are closely arranged through the conductor layer in each of the above-described embodiments. The state in which "two sensor panels are sequentially arranged in the thickness direction" also includes a state in which two sensor panels and the conductor layer are not closely arranged and are separated from each other with a gap therebetween.

In each of the above-described embodiments, the electronic cassette is given as an example of the radiographic image detection device. However, the invention is not limited thereto. The invention can also be applied to a stationary radiographic image detection device that is fixed to the imaging table. In addition, the invention is not limited to X-rays and can also be applied to a case in which other types of radiation, such as γ-rays, are used.

The conjunction "or" described in the specification is not an expression intended to be a limited interpretation of any one of a plurality of options connected by the conjunction depending on the context, but is an expression including combinations of the plurality of options. For example, a sentence "an option A or an option B is performed" needs to be interpreted as having the following three meanings, depending on the context: "an option A is performed"; "an option B is performed"; and "an option A and an option B are performed".

The invention is not limited to each of the above-described embodiments and various configurations may be used as long as they do not depart from the scope and spirit of the invention.

EXPLANATION OF REFERENCES 10, 60, 70: electronic cassette (radiographic image detection device)
11A, 61A: first sensor panel
11B, 61B: second sensor panel
12: housing
13: imaging table
14: holder
15: X-ray source (radiation source)
16: console
17: display
18: input device
25: transmission plate
26A, 26B, 63A, 63B: first and second light detection substrates
27A, 27B, 62A, 62B: first and second scintillators
28, 64: sealing layer (conductor layer)
29, 65, 72: connection portion
30: base
31A, 31B: first and second circuit units
32: power supply unit
33: control unit
40A, 40B: first and second pixels
41A, 41B: first and second gate lines
42A, 42B: first and second signal lines
43A, 43B: first and second imaging regions
44A, 44B: first and second photoelectric conversion units
45A, 45B: first and second TFTs
46A, 46B: first and second gate driving circuits
47A, 47B: first and second signal processing circuits
50: ES image generation unit
51: bone density calculation unit
71, 80: conductor layer
81: switch
H: subject
TD: thickness direction
X: row direction of pixel
Y: column direction of pixel
VP: power supply voltage

What is claimed is:

1. A radiographic image detection device comprising:
   two sensor panels that are sequentially arranged in a thickness direction and have imaging regions in which pixels that accumulate charge in response to radiation, which has been emitted from a radiation source and transmitted through a subject, are two-dimensionally arranged; and
   a conductor layer that is provided between the two sensor panels and has a reference potential.

2. The radiographic image detection device according to claim 1,
   wherein the conductor layer is provided so as to cover at least the imaging regions in a plan view.

3. The radiographic image detection device according to claim 1,
   wherein at least one of the two sensor panels includes a scintillator that converts the radiation which has been incident into visible light and emits the visible light, a light detection substrate in which the imaging region is formed and which detects the visible light emitted from the scintillator and converts the visible light into the charge, and a conductive member of which at least a portion is provided at a position that faces the light detection substrate with the scintillator interposed therebetween, and
   the conductive member functions as the conductor layer.

4. The radiographic image detection device according to claim 1,
   wherein the reference potential is a ground potential or a power supply potential which is a constant potential that is supplied from a power supply unit to the conductor layer and is maintained.

5. The radiographic image detection device according to claim 4, further comprising:
   a switch that switches between an on state in which power is supplied to the conductor layer and an off state in which the supply of power to the conductor layer is stopped in a case in which the reference potential is the power supply potential.

6. The radiographic image detection device according to claim 1,
   wherein the conductor layer is made of any one of aluminum, copper, tin, tungsten, lead, or carbon.

7. The radiographic image detection device according to claim 1,
   wherein two circuit units that convert the charge into a digital signal and output the digital signal as a radiographic image are provided for the two sensor panels, respectively, and
   two radiographic images output from the two circuit units are used to calculate an index value related to bones.

* * * * *